US005817964A

United States Patent [19]
Kosugi

[11] Patent Number: 5,817,964
[45] Date of Patent: Oct. 6, 1998

[54] ELECTRONIC MUSICAL INSTRUMENT AND METHOD FOR STORING A PLURALITY OF WAVEFORM SAMPLING DATA AT A SINGLE ADDRESS

[75] Inventor: Taichi Kosugi, Hamamatsu, Japan

[73] Assignee: Kawai Musical Instruments Manufacturing Co., Ltd., Hamamatsu, Japan

[21] Appl. No.: 838,676

[22] Filed: Apr. 9, 1997

[30] Foreign Application Priority Data

Apr. 12, 1996 [JP] Japan .................................... 8-114384

[51] Int. Cl.[6] ............................... G06F 7/38; G10H 7/02; G10H 7/12

[52] U.S. Cl. ............................................. 84/607; 364/723

[58] Field of Search ...................... 84/603–607; 364/723, 364/724.1

[56] References Cited

U.S. PATENT DOCUMENTS

| | | | |
|---|---|---|---|
| 5,342,990 | 8/1994 | Rossum | 84/603 |
| 5,677,503 | 10/1997 | Kurata | 84/604 |
| 5,689,080 | 11/1997 | Gulick | 84/604 |

*Primary Examiner*—Stanley J. Witkowski
*Attorney, Agent, or Firm*—Christie, Parker & Hale, LLP

[57] ABSTRACT

Waveform memory (12) stores a plurality of consecutive waveform sampling value data at a single address. Even when some waveform sampling values are skipped in a process of reproducing a musical tone of a frequency higher than a pitch inherent to a waveform prestored in the memory (12), all of the consecutive sampling values are sequentially read out and stored in temporary storage means (40~46) so that the interpolation calculation is accurately performed using the consecutive sampling values.

12 Claims, 5 Drawing Sheets

ELECTRONIC MUSICAL INSTRUMENT AND METHOD FOR STORING A PLURALITY OF WAVEFORM SAMPLING DATA AT A SINGLE ADDRESS

BACKGROUND OF THE INVENTION

1. Field of the Invention

The present invention relates to an electronic musical instrument, and in particular to an electronic musical instrument in which, to enable the skipping of waveform sample data during reading out, a plurality of consecutive waveform sample data are stored at the same address in a waveform memory.

2. Description of the Related Arts

Conventional electronic musical instruments, such as synthesizers, electronic pianos, electronic organs and single keyboards, produce musical tones by storing a waveform sampling value at each address in a waveform memory and by reading waveform sampling values at a reading interval that corresponds to a pitch, and by performing interpolation calculation of the sampling values to reduce noise.

A plurality of sampling values near phase data (reading-out position) are required for interpolation calculations. Since the number of tone generation channels provided in a tone generator has been increased recently, it is not economical for all the necessary waveform sampling values for each channel to be read in its time-sharing calculation period because a memory with a very fast access speed is required.

It has therefore been proposed that storage means be provided for each channel to temporarily store a plurality of waveform sampling values near a phase data that were previously read, and that the contents in the storage means and the waveform sampling values read out in the time-sharing calculation period for each channel be employed to perform interpolation calculation. With this arrangement, an inexpensive memory having a comparatively slow access speed can be used as a waveform memory.

In a tone generation system for conventional electronic musical instruments mentioned above, in order to employ for interpolation a plurality of waveform sampling values stored in the temporary storage means, they must be consecutive. Skipping addresses in reading out of a waveform memory is, therefore, impossible, i.e., waveforms cannot be read by changing two or more reading addresses at one time. Thus, in the process for reading a tone waveform out of the waveform memory for tone reproduction, it is not possible to reproduce a musical tone whose frequency is higher than an inherent pitch (frequency) that is determined both by the pitch of an original tone having a stored waveform and by a sampling frequency thereof.

SUMMARY OF THE INVENTION

It is an object of the present invention to provide an electronic musical instrument and method which allows skipping addresses in reading waveform sampling values out of the memory, and can reproduce a musical tone having a frequency higher than a pitch inherent to a waveform prestored in the memory.

To achieve the above object, according to the present invention, provided is an electronic musical instrument for generating a tone signal by reading out waveform sampling value data stored in waveform data storage means, in which a plurality of contiguous or consecutive waveform sampling value data are stored in a set at a single address. When, for example, four of sampling value data are stored at a single reading address in the memory, even if three waveform sampling values are skipped, all of the consecutive waveform sampling values are sequentially read from the waveform memory and are stored in temporary storage means, so that interpolation can be accurately performed. Therefore, musical tone reproduction can be effected at a frequency four times higher at most than that available with a conventional system.

DETAILED DESCRIPTION OF THE PREFERRED EMBODIMENT

Figure 1:
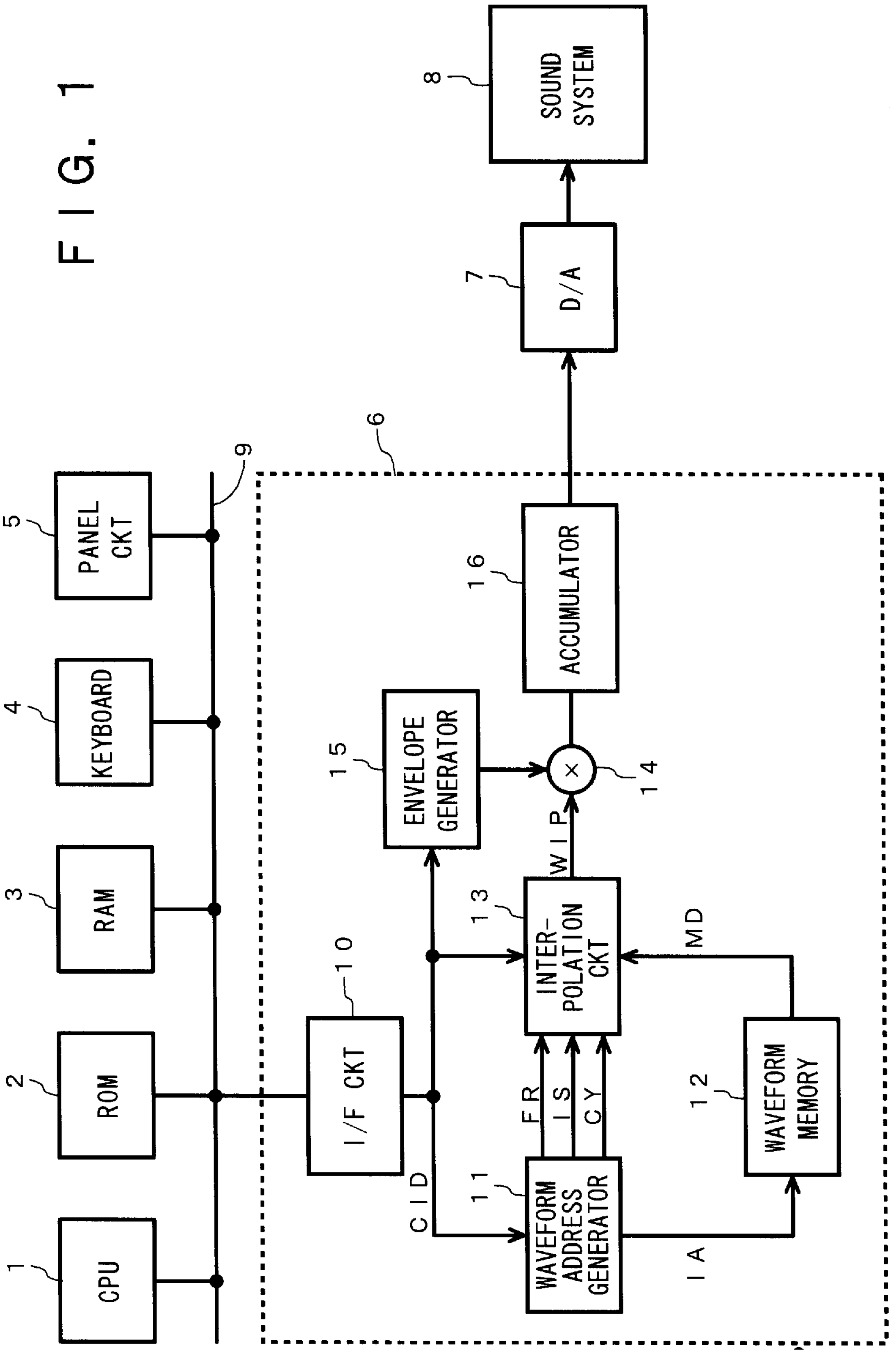
FIG. 1 is a block diagram illustrating an electronic piano according to the present invention.

An embodiment of the present invention will now be described in detail while referring to the accompanying drawings. FIG. 1 is a diagram illustrating the arrangement of an electronic piano according to the present invention. A CPU 1 controls the entire electronic piano in consonance with a control program stored in a ROM 2. In the ROM 2 are stored the control program, a timbre parameter, a frequency data table, etc. The timbre parameter includes address information for a tone waveform stored in a waveform memory, an initial tone waveform sampling value, a tone waveform sampling rate, and envelope control data and the like. The frequency data table is a conversion table used to determine a read interval for tone waveforms, by using pitch (key number) data instructed at a keyboard, and tone waveform sampling rate (inherent pitch) data.

A RAM 3 serves as a work area and a buffer. The RAM 3 may be backed up by a battery. A keyboard 4 includes a plurality of keys, each of which is provided with two switches, and a keyboard scan circuit for scanning key switches on the keyboard 4, and for detecting state change data and touch data and transmitting them to the CPU 1. A panel circuit 5 includes various switches for selecting the timbre and/or the musical piece to be automatically played, a display device for displaying characters, etc, using a liquid crystal display or LEDs, and an interface circuit for them.

A tone generator 6 generates a desired musical tone signal using the waveform reading system. The tone generator 6 sequentially reads data from a waveform memory 12, in which digital tone waveform sampling values are stored, at an address interval that is proportional to a pitch at which a musical tone is to be generated, and performs interpolation for generation of a tone waveform signal. An envelope generator 15 produces an envelope signal based on a set of envelope parameter signals. A multiplier multiplies the tone waveform signal by the envelope signal and outputs a musical tone signal with the envelope. Although the tone generator 6 has a plurality (e.g., 128) of tone generation channels, actually, a single tone generation circuit may be operated in a time sharing multiplexing manner to independently and simultaneously generate a plurality of tone signals.

An interface circuit 10 transmits to the individual sections in the tone generator 6 a write instruction of data CID received from the CPU 1 through a bus 9. In accordance with the instruction from the CPU 1, a waveform address generator 11 generates a reading address IA for the waveform memory 12, and interpolation data FR, IS and CY that are output to an interpolation circuit 13, which will be described later in more detail. At a single address in the waveform memory 12 are stored four (in general, any plural number, preferably $2^n$) of consecutive waveform sampling values MD.

The interpolation circuit 13 performs interpolation in consonance with the waveform sampling value data MD from the waveform memory 12 and the interpolation data from the waveform address generator 11, and outputs a waveform value (signal) WIP. A multiplier 14 multiples the waveform signal WIP by an envelope signal originating at the envelope generator 15, and outputs a tone waveform signal for each channel. An accumulator 16 adds tone signals that are generated at each sampling (calculation) cycle in a plurality of tone generation channels respectively, and outputs the resulting digital tone signal.

A D/A converter 7 converts a digital tone signal into an analog signal, which is then released through a sound system 8 constituted by an amplifier and a loudspeaker. The bus 9 is used to connect the individual circuits in the electronic piano. A memory card interface circuit, a floppy disk driver and a MIDI interface circuit (none of them shown) may be provided as needed.

Figure 2:
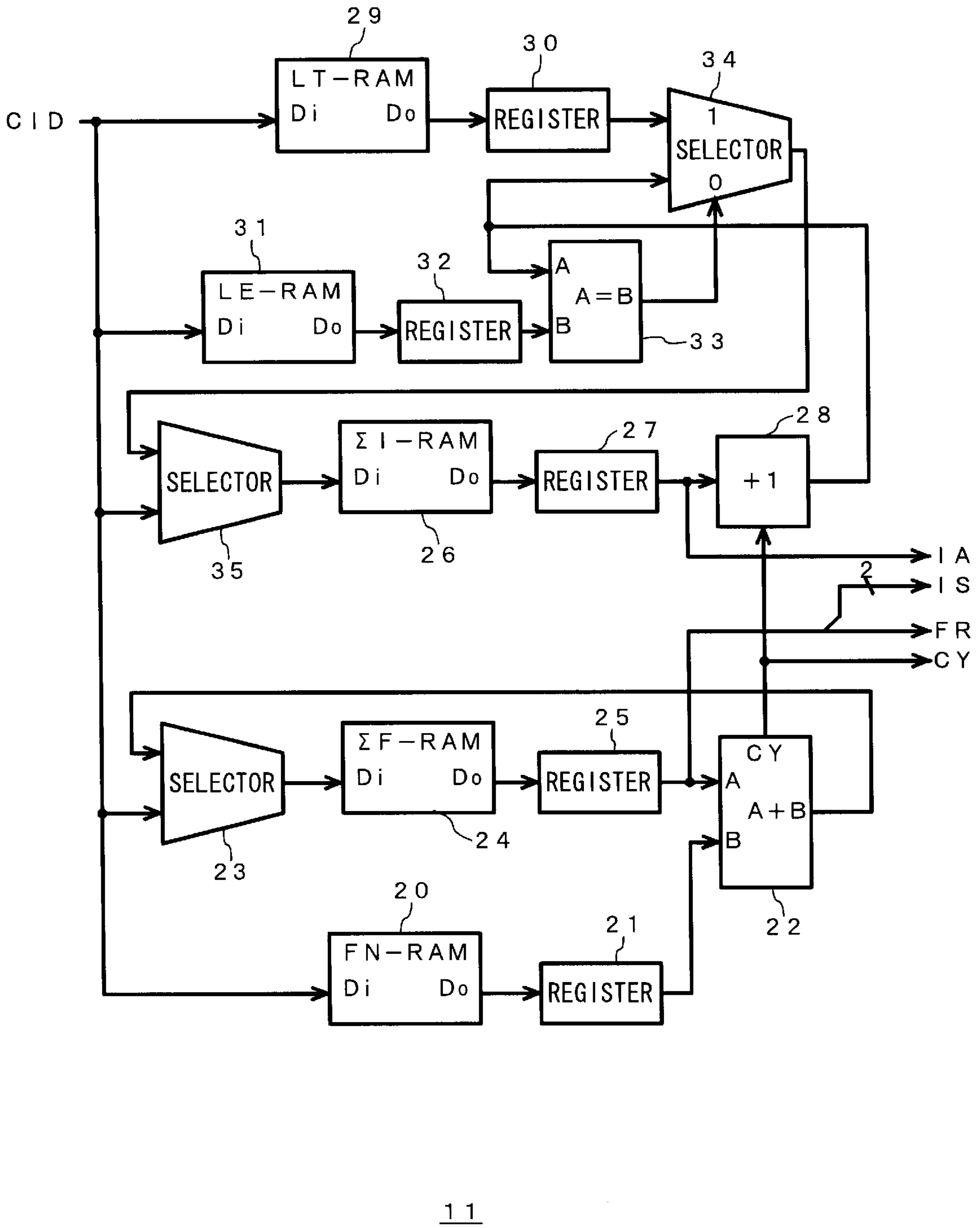
FIG. 2 is a block diagram illustrating a waveform address generator.

FIG. 2 is a block diagram illustrating an arrangement of the waveform address generator 11. An FN-RAM 20 is a 128-word RAM in which frequency data that is interval data for reading a tone waveform, is stored for each channel. An address of the FN-RAM 20 is designated by a channel counter (modulo 128 counter) of a timing controller (not shown). Other RAM's 24, 26, 29 and 31 are also addressed in a similar manner. The frequency data in the RAM 20 is set by the CPU 1 at key-ON time or beginning of musical tone generation, and is set to four or less in this embodiment. A write address for the data is also instructed by the CPU 1. Data that are read from the FN-RAM 20 are temporarily stored in a register 21, and are then transferred to an adder 22.

It should be noted that at key-ON time, the CPU 1 sets the loop end value, the loop top value, the reading address IA and the data IS and FR in an LE-RAM 31, an LT-RAM 29, a ΣI-RAM26, and a ΣF-RAM24, respectively. A set of the signal IA, IS and FR represents read phase data of the tone waveform: FR defining its fractional part, IS defining the two least significant bits in the integer part, and IA defining the remaining upper (more significant) bits in the integer part except IS bits.

The adder 22 is supplied with data IS (the two least significant bits in the integer part of the read phase data) and data FR (the fractional part of the phase data), which are read out of the ΣF-RAM 24 and held in a register 25. The output of the adder 22 is written in the ΣF-RAM 24, via a selector 23, as new data IS and FR. Frequency data are accumulated through this process. The selector 23 selects CID when the data (initial values of IS and FR) is to be written to the ΣF-RAM 24 by the CPU 1 so that, for example, parameters are set in a channel in response to a key-ON.

A ΣI-RAM 26 is a 128-word RAM in which the reading address signal IA for the waveform memory 12 is stored, and an initial value is set in the ΣI-RAM 26 through the selector 35 by the CPU 1 in response to a key-ON. The reading address signal IA, which is read from the RAM 26, is held in a register 27, and is then externally output and is also transferred to a +1 adder 28. When the addition result obtained by the adder 22 is four or greater, the adder 22 outputs a carry signal CY for carrying to the third least significant bit in the integer part. The carry signal CY serves as a renewal signal of the reading address for the memory. When CY is 1, the +1 adder 28 increments the input signal IA by one, and outputs the resultant signal IA. When CY is 0, the adder outputs the input value unchanged. A signal output from the +1 adder 28 is transmitted to a comparator 33 and a selector 34. The comparator 33 compares the signal value received from the +1 adder 28 with the value LE of a loop end (last end in a repetitive reading range) of waveform memory reading address that is held in the register 32. When these values match, the comparator 33 outputs a "1." When the output value of the comparator 33 is "0," the selector 34 selects the signal output by the +1 adder 28; while when the output value is "1," the selector 34 selects a value LT of a loop top (the head in the repetitive reading range) of the waveform memory reading address, which is read from a LT-RAM 29 and is held in the register 30.

Generated in the above described manner are the waveform memory reading address IA and the signals IS, FR and CY that are required for interpolation.

Figure 3:
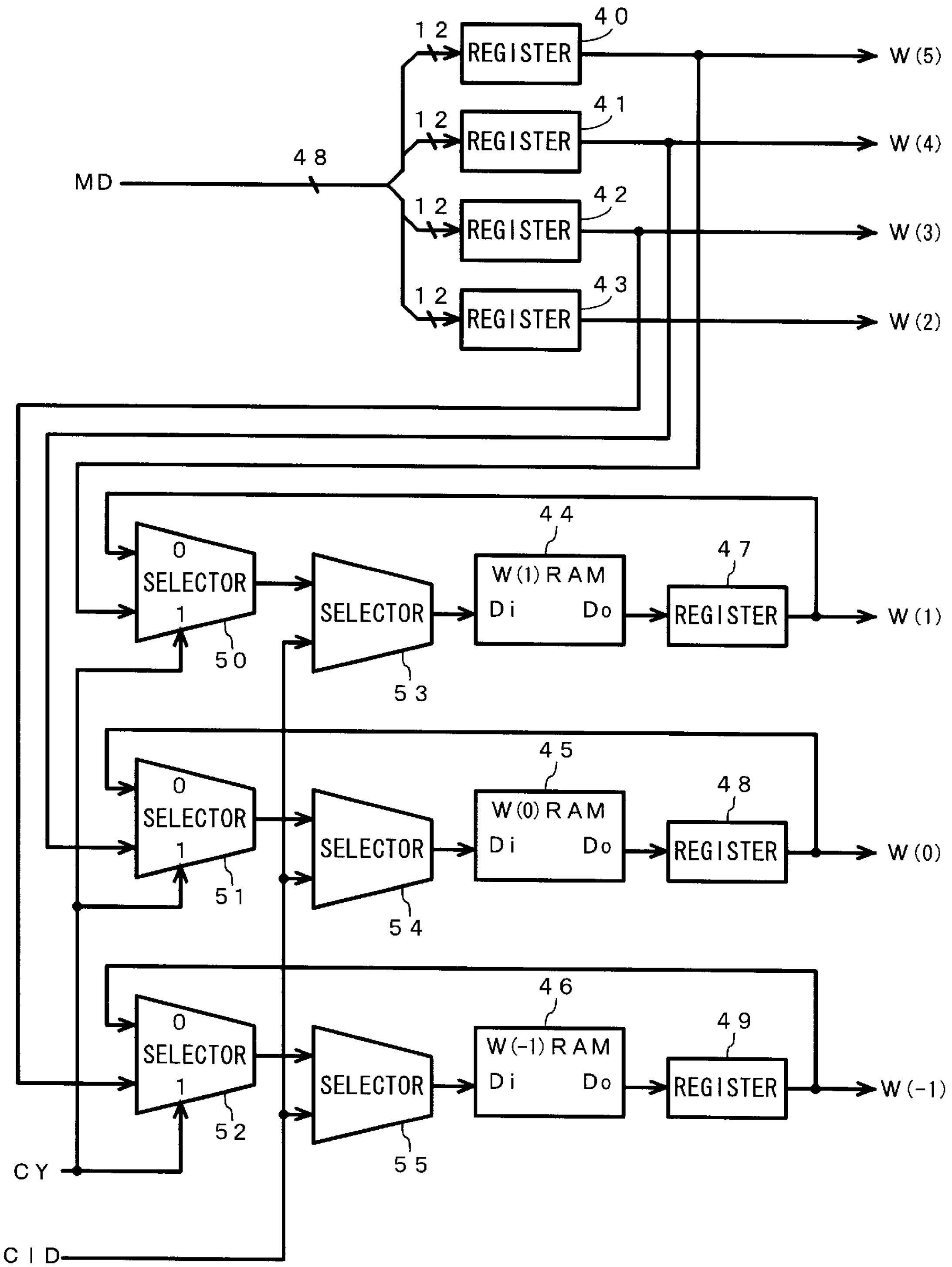
FIGS. 3 and 4 taken together are a block diagram illustrating a sampling interpolation circuit.
Figure 4:
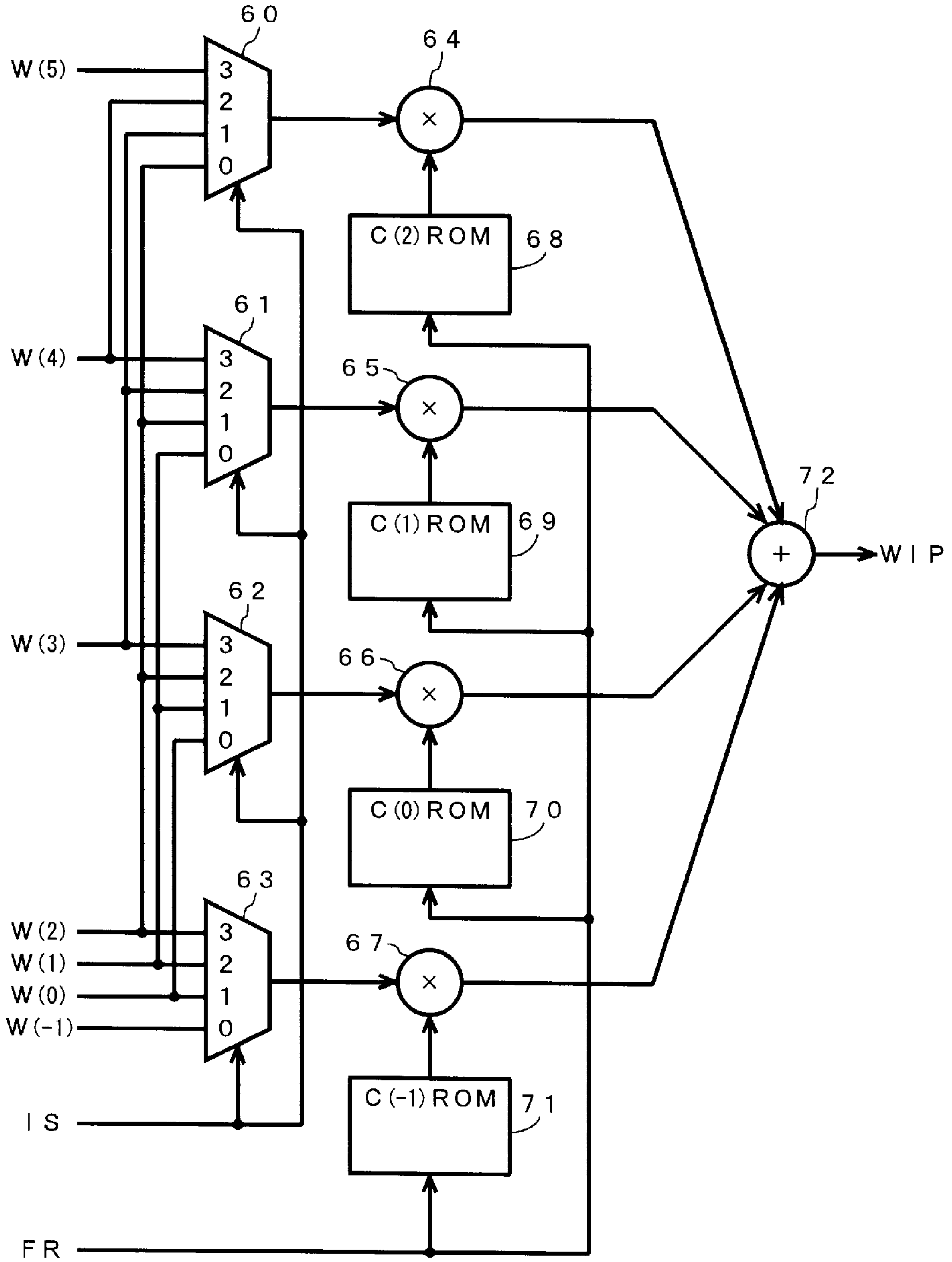

FIGS. 3 and 4 are block diagrams that together illustrate the interpolation circuit 13. In the waveform memory 12, for example, one word consists of 48 bits, and four consecutive waveform sampling value data MD, each of 12-bit, are stored at a single address. The four consecutive sampling value data read from the waveform memory 12 are separately held in four 12-bit registers 40 through 43, and are output as sampling values W(2) through W(5). The output values of the registers 40 through 42 are also transmitted to selectors 50 through 52.

A W(1) RAM 44, a W(0) RAM 45 and a W(−1) RAM 46 are 128-word RAMs in which values W(5), W(4) and W(3), that are supplied by the registers 40 through 42 respectively, are stored when a CY signal, which is a waveform memory address update signal, is "1." The values can be set in the individual RAMs through the selectors 53, 54 and 55 by the CPU 1 at key-ON time. The sampling values read from the RAMs 44 through 46 are held in registers 47 through 49, and are output as W(1), W(0) and W(−1) for interpolation. When CY is 0, the sampling values W(1), W(0) and W(−1) are again written in the RAMs 44 through 46. Therefore, seven consecutive sampling values W(5) through W(−1) are held in the registers.

In the interpolation circuit half shown in FIG. 4, each selector 60 through 63 outputs one sampling value as four selected signals, which are designated on the basis of the IS value (that is 0~3) in advance from among W(5) through W(−1). While the value of the fractional part FR of the phase data is employed as an address, corresponding interpolation coefficients are read from a C(2)ROM 68 through a C(−1) ROM 71 for the generation of interpolation coefficients. Any known interpolation coefficients can be used in the present invention. Multipliers 64 through 67 multiply sampling values selected by the selectors 60 through 63 by the coefficients C(2) through C(−1) output by the ROMs 68 through 71. The products produced by the multipliers 64 through 67 are added together by an adder 72, and a waveform signal WIP for which interpolation is performed is output.

Figure 5:
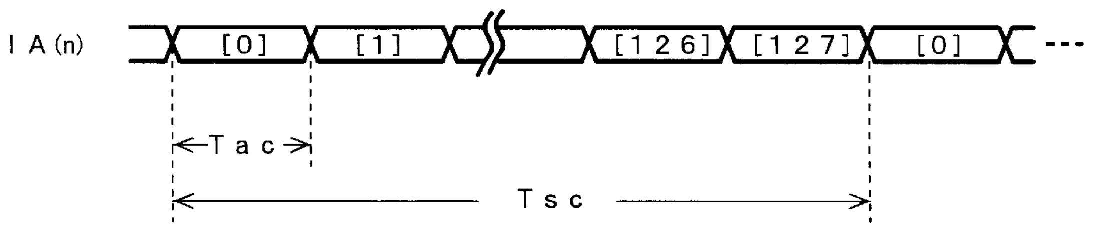
FIG. 5 is a timing chart showing the change in read addresses.

FIG. 5 is a timing chart showing the change in the reading address IA for the waveform memory 12. [n] in IA(n) denotes a reading address for the n-th channel. Tsc denotes a sampling cycle, and may be 50 kHz, for example. Tac denotes an access cycle for the waveform memory 12, and may be 156 ns at 50 kHz (=1 sec/50×$10^3$×128), for example. Since in this embodiment the waveform memory has to be accessed only once every sampling time for one channel, Tac is equal to the processing time for each tone channel. Therefore, a comparatively inexpensive mask ROM having an access time of 120 to 150 ns can be used as a waveform memory.

Figure 6:
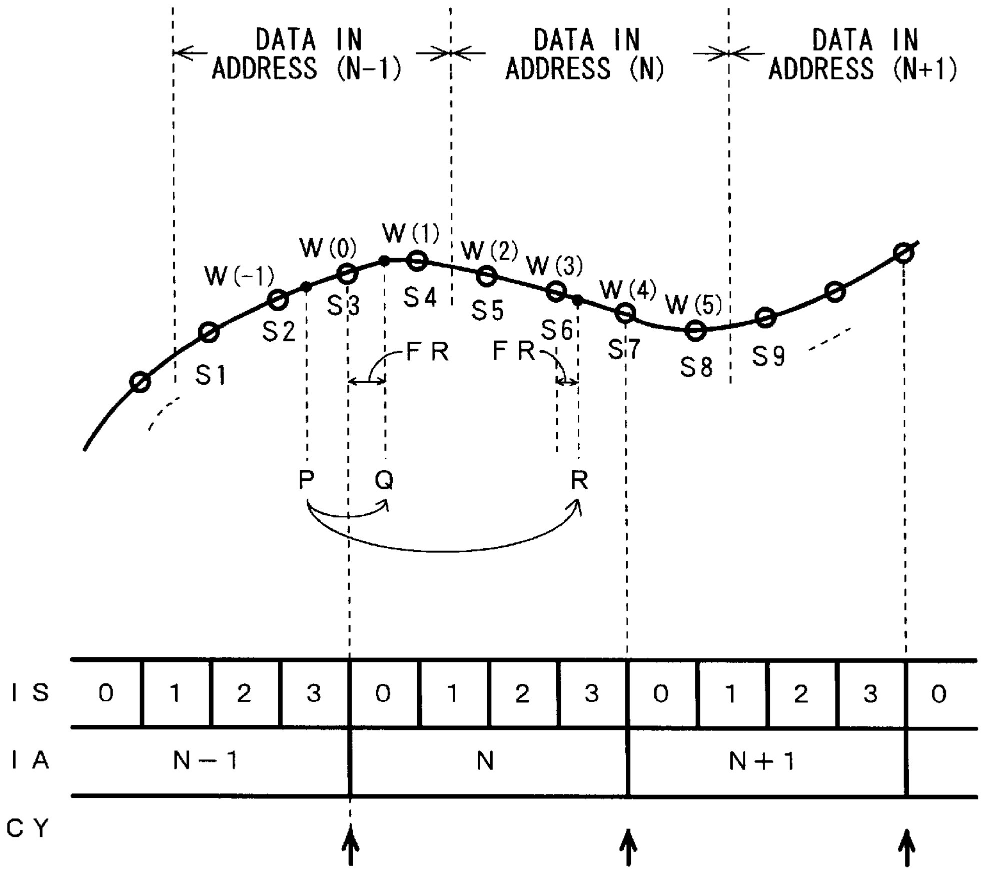
FIG. 6 is an explanatory diagram showing the operation of a tone generator according to the present invention.

FIG. 6 is an explanatory diagram illustrating the operation of the tone generator 6 according to the present invention. Output value WIP of the interpolation circuit 13 is represented as follows:

$$WIP=C(-1)\times W(IS-1)+C(0)\times W(IS)+C(1)\times W(IS+1)+C(2)\times W(IS+2),$$

where C(−1) through C(2) are interpolation coefficients determined by the fractional part FR of the phase data, and are output from the interpolation coefficient generation ROMs 68 through 71 as shown in FIG. 4. W(IS −1) and W(IS) are two sampling values which are selected by the IS value and preceding the current phase data value, and WS(IS+1) and WS(IS+2) are the other two sampling values which are selected by the IS value and following the current phase data value.

In FIG. 6, suppose that immediately before phase data the position was P, and that it has been moved to position Q which is of current phase data. Since IS value is already 3 at point P, a carry signal CY will be generated as the result of addition performed by the adder 22 in FIG. 2. In consonance with this CY signal, the waveform memory read address IA is updated from N−1 to N. Further, sampling value data S4 through S2 at the N−1 address, which are stored in the registers 40 to 42, are transmitted to the W(1) RAM 44, the W(0) RAM 45 and the W(−1) RAM 46, and are then output as W(1), W(0) and W(−1), respectively, as shown in FIGS. 3 and 6.

The following consecutive four data S8 through S5 are read out from the N-th address of the waveform memory 12 to be stored in the registers 40 through 43 and output as sampling values W(2) through W(5). FIG. 6 shows the relationship between the sampling values S(i) in this state and data W(j) stored in the registers 40 through 43 and 47 through 49 of the interpolation circuit 13. As shown in FIG. 6, the sampling value S5 through S8 read out of the reading address IA=N and the sampling values S3 through S6 corresponding to the address N are shifted by two sampling locations. This is because the sampling value at two sampling locations forward of the current value of the phase data is required to perform interpolation in the present embodiment.

In FIG. 6, when the phase data is moved from the immediately previous point P to a current point R, the reading operation of the sampling values can be performed in the same manner as described above to enable correct interpolation. As easily understood from the above description, in this embodiment, the reading of the waveform sampling values can be skipped when the value of the frequency data is 4 or less. With this waveform memory, it is possible to reproduce musical tones for which the frequency is four times as high as the normal frequency (the value of the frequency data is less than 1).

The following modification of the present invention can be provided. With a conventional system wherein only one sampling value is stored in each address of the memory and sampling values are read one by one, the CPU has to preset sampling values in an interpolation circuit for interpolation at key-ON time. According to the present invention, the initial value of IS can be set to three, so that interpolation can be performed, for the phase data IS=3 in address IA=N−1, for example, by using only four sampling values S1~S4 that are read from the address (N−1) of the waveform memory, and therefor, the presetting of a sampling value into the RAM44 through 46 is not required.

When the present invention is applied for an electronic musical instrument that compresses sampling values using, for example, the ADPCM (Adaptive Differential Pulse Code Modulation) system, and stores the compressed values in a waveform memory, only an ADPCM decoder need be provided immediately after the registers 40 through 43 in FIG. 3.

In the aforementioned embodiment, interpolation is performed by using four sampling values, two each of which precede and follow the current phase data. The number of samples used for interpolation does not necessarily equal the number of samples stored at one address in the waveform memory. The interpolation circuit in this embodiment may perform interpolation using two sampling data: one sample taken at a preceding and one taken at a succeeding the current phase data point.

According to the present invention, a plurality of consecutive waveform sampling value data are stored in a set at one address in the waveform data storage means. When four sampling value data, for example, are stored in a set at a single read address, even though three waveform sampling values are skipped, all of the consecutive waveform sampling values are sequentially read out of the waveform memory and stored in the temporary storage means in order that interpolation can be perfectly performed. Assuming that the number of the sampling values stored in a set at one address in the waveform memory is N, musical tones the frequency of which is N times higher than that for a conventional system, can be reproduced by using the waveform memory.

What is claimed is:

1. An electronic musical instrument for generating a musical tone signal, the electronic musical instrument comprising:

waveform data storage means comprising a plurality of storage addresses, each of the plurality of storage addresses containing a plurality of consecutive waveform sampling values;

phase data generation means for generating phase data by accumulating frequency data corresponding to a designated pitch;

reading means for reading at one time each of the plurality of waveform sampling values stored at one of the plurality of addresses of said waveform data storage means in consonance with said phase data;

temporary storage means for temporarily storing at least a part of said plurality of waveform sampling values previously read out of said waveform storage means; and interpolation means for performing interpolation calculations based on said waveform sampling values read out by said reading means, said waveform sampling values stored in said temporary storage means, and said phase data.

2. The electronic musical instrument of claim 1 wherein the plurality of waveform sampling values stored at each of the plurality of storage addresses is $2^n$ waveform sampling values, wherein n is an integer.

3. The electronic musical instrument of claim 1 wherein the phase data comprises an integer part being used to designate a reading address in the waveform data storage means, and a fractional part being used to set interpolation coefficients used by the interpolation means.

4. The electronic musical instrument of claim 3 wherein the integer part comprises an upper significant digit corresponding to the reading address and a lower significant digit to designate one of the plurality of the waveform sampling values stored at the reading address.

5. The electronic musical instrument of claim 1 wherein at least the part of said plurality of waveform sampling values previously read out by the reading means is temporarily stored in the temporary storage means before a new plurality of waveform sampling values are read out of the waveform data storage means in response to an update of the reading address.

6. An electronic musical instrument for generating a musical tone signal by waveform sampling, the electronic musical instrument comprising:

a waveform data memory comprising a plurality of storage addresses wherein a plurality of consecutive waveform sampling values are stored at each of the plurality of storage addresses;

a phase data generator for generating phase data corresponding to a designated pitch;

a waveform address generator for generating a reading address from the plurality of storage addresses of the waveform data memory;

an reading circuit for reading at one time each of the plurality of consecutive waveform sampling values stored at one of the plurality of storage addresses in consonance with said phase data;

a temporary storage memory for temporarily storing at least part of the plurality of consecutive waveform sampling values previously read by the reading circuit;

an interpolation circuit for producing a waveform signal by performing interpolation based on the waveform sampling values transmitted from the reading circuit, the waveform sampling values transmitted from the temporary storage memory, and the phase data.

7. The electronic musical instrument of claim 6 wherein the plurality of waveform sampling values stored at each of the plurality of storage addresses is $2^n$ waveform sampling values, wherein n is an integer.

8. The electronic musical instrument of claim 6 wherein the phase data comprises a integer part for designating the reading address from the waveform data storage memory.

9. The electronic musical instrument of claim 8 wherein the phase data further comprises a fractional part for generating a plurality of interpolation coefficients for the interpolation circuit.

10. The electronic musical instrument of claim 8 wherein the integer part comprises an upper digit corresponding to the reading address and a lower digit for designating one of the plurality of consecutive waveform sampling values stored at the reading address.

11. The electronic musical instrument of claim 6 wherein at least part of the plurality of consecutive waveform sampling values previously read by the reading circuit are stored by the temporary storage means before a new plurality of consecutive waveform sampling values are read out by the reading circuit.

12. A method of generating a music tone signal by waveform sampling, the method comprising the step of providing a waveform data storage memory having a plurality of storage addresses;

storing a plurality of consecutive waveform sampling values at each of the plurality of storage addresses;

generating phase data corresponding to a designated pitch;

generating a reading address from the plurality of storage addresses of the waveform data storage memory;

reading at one time each of the plurality of consecutive waveform sampling values stored at the reading address in consonance with said phase data;

providing temporary storage means;

temporarily storing in the temporary storage means at least a part of the plurality of consecutive waveform sampling values previously read out of the waveform data storage memory; and interpolating to produce a waveform signal based on the waveform sampling values read out of the reading address, the waveform sampling values stored in the temporary storage means, and the phase data.

* * * * *